June 5, 1923.
T. C. MORRIS
VALVE FOR TANKS, ETC
Filed March 18, 1920
1,457,743
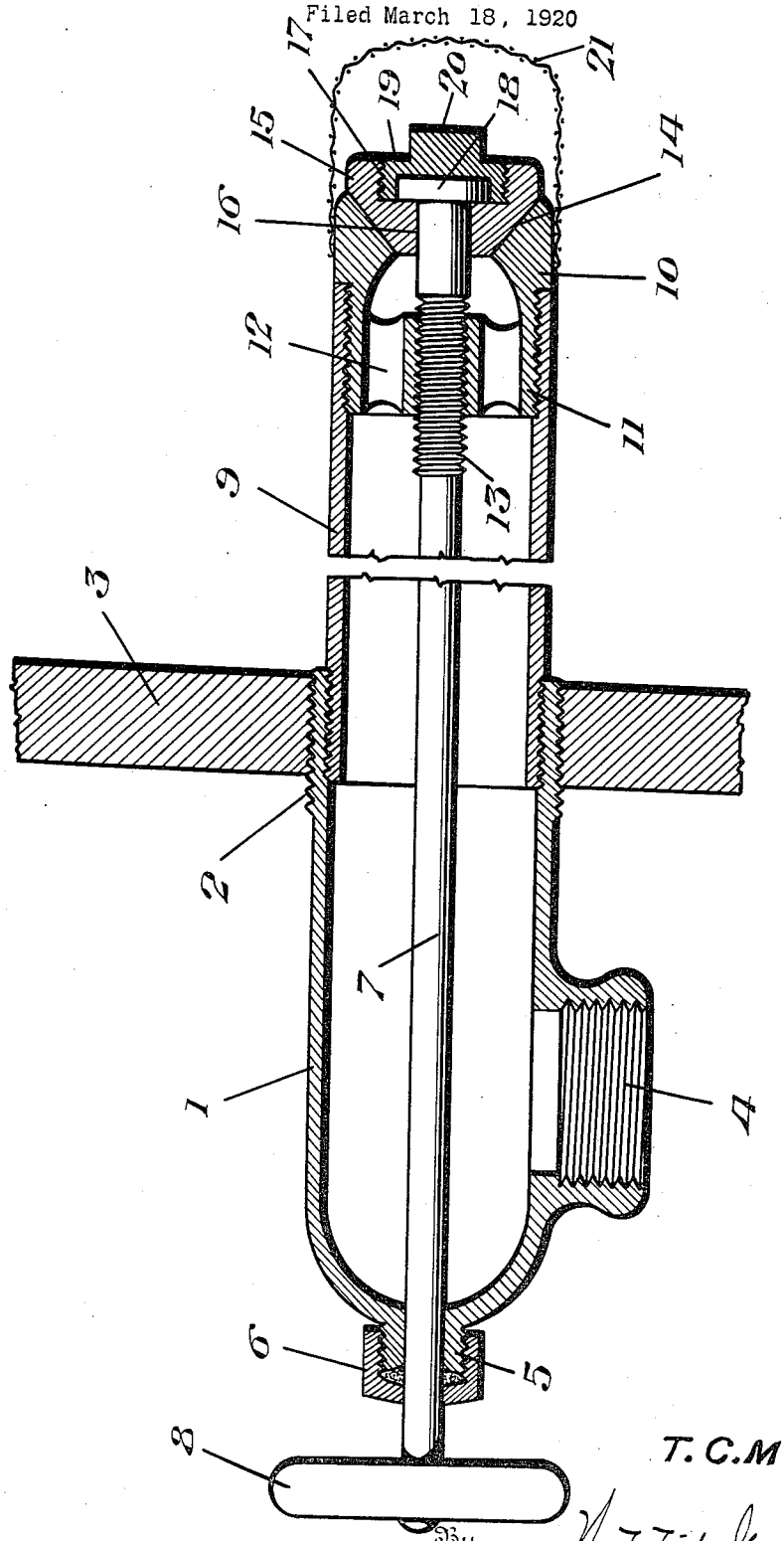
Inventor
T. C. MORRIS Patented June 5, 1923.

1,457,743

UNITED STATES PATENT OFFICE.

THOMAS C. MORRIS, OF HARRISVILLE, WEST VIRGINIA.

VALVE FOR TANKS, ETC.

Application filed March 18, 1920. Serial No. 367,020.

*To all whom it may concern:*

Be it known that I, THOMAS C. MORRIS, a citizen of the United States, residing at Harrisville, in the county of Ritchie and State of West Virginia, have invented certain new and useful Improvements in Valves for Tanks, Etc.; and I do hereby declare the following to be a full, clear, and exact description of the invention, such as will enable others skilled in the art to which it appertains to make and use the same.

This invention relates to valves, and more especially to valves for use on water tanks, such as used for supplying water to locomotives, or for boilers and the like.

It is the object of the invention to provide a valve of a construction in which the valve member will be located within the tank, to avoid the outlet of the tank becoming clogged by the freezing of the water, such as frequently occurs when the valve is located on the outside of the tank as usual.

Another object is the provision of such a valve having a casing of a construction to be secured through the wall of a tank, with the operating handle or member on the exterior, and the valve seat and valve member on the interior of the tank, and such valve seat and member being of novel construction to efficiently serve the intended purposes.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawing, wherein the figure is a median longitudinal section, portions being broken away and others shown in elevation.

The valve casing has an outer tubular section 1, the rear end of which is exteriorally threaded as at 2, so as to screw within an outlet hole in the wall 3 of the tank, boiler, or the like, and said section 1 has a lateral outlet 4 between its ends. The outer end of said section 1 has a boss 5 on which a packing or stuffing box gland 6 is screw threaded, and the valve rod or stem 7 extends axially within the casing sections and through the stuffing box, preventing leakage where said rod extends out of the casing. The outer end of the rod has a handle or wheel 8 for turning it conveniently from the exterior of the tank. The other section 9 of the valve casing is also tubular, and has its outer end screw threaded within the inner or rear end of the section 1, and the tubular section 9 may be of any suitable length, to extend the desired distance into the tank.

The valve seat and valve member are located at the inner end of the section 9, thereby shutting off the water at a distance from the exterior of the tank, so as to avoid the water freezing adjacent to the valve member, as frequently occurs when the valve is located on the exterior. An annular cuff 10 abuts the inner end of the casing section 9 and has a reduced extension 11 screw threaded within said section, and said cuff has a bevelled valve seat 14 at its inner end, and the extension 11 has a spider 12 therein through the hub of which the valve rod or stem 7 is screw threaded, as at 13.

The valve member 15 is swivelled on the inner end of the rod 7 to be carried to and from the seat 14 when the rod 7 is rotated. This valve member 15 is bevelled or formed with a conical face to bear against the seat, and the opposite face or side of the valve member has a recess 17 receiving a circular head 18 on the inner end of the rod 8. A cap or plug 19 is screw threaded in the recess 17 and has a recess receiving the head 18, thereby swivelling the valve member over the head 18, and compelling the valve member to move longitudinally with the rod 7 when it is screw threaded through the spider 12 by the rotation of the handle 8. The cap or plug 19 has a lug 20 for the engagement of a wrench or other implement in applying or removing the valve member. The swivel head of the valve rod or stem is thus located within the valve member 15 and cap 19, thereby affording an efficient swivel.

It is preferable to secure a wire mesh or other equivalent guard 21 on the cuff 10 surrounding the valve member and seat, thereby straining the water which passes through the valve, and avoiding foreign objects lodging within the valve.

By turning the handle 8, the rod 7 can be screwed inwardly, thereby forcing the valve member from its seat, and allowing the water to flow into the valve casing from the inner end, and through the outlet 4, and when the valve is closed, the water will drain from the casing, leaving it empty. The valve member is sufficiently removed from the atmosphere to avoid the freezing of the water beyond the inner end of the valve casing, so as to give no hindrance to drawing water from the tank even in freezing temperature.

Having thus described the invention, what is claimed as new is:—

1. A valve comprising an elongated casing having two tubular sections, one end of one section being secured within the adjacent end of the other section, the secondnamed section having means on the exterior adjacent to said end for securing it in the wall of a tank with the firstnamed section within said tank, the secondnamed section having an outlet, the firstnamed section having a valve seat at its opposite end, a valve rod extending through the casing and out through the secondnamed section thereof, and a valve member carried by said rod beyond the end of the casing having the valve seat, to bear against said seat.

2. A valve comprising a casing having two sections, one section being detachably secured to the other section, the secondnamed section having means for securing it to the wall of a tank with the firstnamed section within said tank, the secondnamed section having an outlet, the firstnamed section having a valve seat, a valve rod extending through the casing and out through the secondnamed section thereof, a valve member carried by the rod to bear against said seat, and a screw connection between said rod and firstnamed section of the casing.

In testimony whereof I have signed my name to this specification in the presence of two subscribing witnesses.

THOMAS C. MORRIS.

Witnesses:
H. M. ALLENDER,
J. A. HOOVER.